United States Patent
Song

(10) Patent No.: US 10,569,365 B2
(45) Date of Patent: Feb. 25, 2020

(54) METHOD FOR PREPARING A FLUID FLOW SURFACE

(71) Applicant: The Boeing Company, Chicago, IL (US)

(72) Inventor: Weidong Song, Woodinville, WA (US)

(73) Assignee: The Boeing Company, Chicago, IL (US)

(*) Notice: Subject to any disclaimer, the term of this patent is extended or adjusted under 35 U.S.C. 154(b) by 144 days.

(21) Appl. No.: 14/948,836

(22) Filed: Nov. 23, 2015

(65) Prior Publication Data

US 2017/0144255 A1 May 25, 2017

(51) Int. Cl.

| *B23K 26/352* | (2014.01) |
|---|---|
| *B23K 26/364* | (2014.01) |
| *B64C 21/10* | (2006.01) |
| *B23K 26/06* | (2014.01) |

(52) U.S. Cl.
CPC ........ *B23K 26/364* (2015.10); *B23K 26/0604* (2013.01); *B64C 21/10* (2013.01); *B64C 2230/26* (2013.01); *Y02T 50/166* (2013.01)

(58) Field of Classification Search
CPC .............. B23K 26/364; B23K 26/0604; B23K 26/362; B23K 26/36; B23K 26/402; B23K 2201/006; B23K 2201/34; B23K 2201/35; B23K 2203/166; B23K 2203/172; B23K 26/0869; B23K 26/08; B23K 26/067; B23K 26/0676; B23K 26/0084; B64C 21/10; B64C 2230/26; Y02T 50/166
USPC ............ 219/121.72, 121.69, 121.76, 121.77; 264/400, 482
See application file for complete search history.

(56) References Cited

U.S. PATENT DOCUMENTS

| 4,706,910 | A |   | 11/1987 | Walsh et al. |
|---|---|---|---|---|
| 4,907,765 | A | * | 3/1990 | Hirschel ................. B64C 21/10 244/130 |
| 4,994,639 | A | * | 2/1991 | Dickinson ............... B64C 21/10 219/121.68 |
| 5,542,630 | A |   | 8/1996 | Savill |
| 5,656,186 | A | * | 8/1997 | Mourou ................. A61B 18/20 219/121.69 |

(Continued)

FOREIGN PATENT DOCUMENTS

| CN | 102138009 | 7/2011 |
|---|---|---|
| DE | 10 2008032618 | 1/2010 |

(Continued)

OTHER PUBLICATIONS

Bado et al., "Ultrafast Laser Micromachining Handbook," http://www.cmxr.com/Education/Introduction.html (2011).

(Continued)

*Primary Examiner* — Tu B Hoang
*Assistant Examiner* — Masahiko Muranami
(74) *Attorney, Agent, or Firm* — Walters & Wasylyna LLC

(57) ABSTRACT

A system and method for preparing a fluid flow surface may include the steps of: (1) producing a laser beam, (2) moving the laser beam across a surface of a work piece, and (3) machining a riblet in the surface by removing material from the surface, wherein the riblet includes a pair of ridges, wherein the pair of ridges is approximately parallel to each other, and each one of the ridges includes opposed sides, and a groove formed between facing ones of the sides and separating the ridges.

20 Claims, 9 Drawing Sheets

(56) References Cited

U.S. PATENT DOCUMENTS

| | | | |
|---|---|---|---|
| 5,747,769 A * | 5/1998 | Rockstroh | B23K 26/364 219/121.69 |
| 6,345,791 B1 * | 2/2002 | McClure | B63B 1/34 244/130 |
| 6,693,656 B1 * | 2/2004 | Koide | B41J 2/15 347/224 |
| 8,026,459 B2 * | 9/2011 | Tanaka | G02B 1/11 219/121.69 |
| 8,444,092 B2 | 5/2013 | Li et al. | |
| 9,631,648 B2 | 4/2017 | Schuetze et al. | |
| 2003/0201578 A1 | 10/2003 | Li et al. | |
| 2004/0000540 A1 | 1/2004 | Soboyejo et al. | |
| 2005/0211680 A1 * | 9/2005 | Li | A61F 2/0077 219/121.68 |
| 2009/0007933 A1 | 1/2009 | Thomas et al. | |
| 2010/0127125 A1 * | 5/2010 | Li | B21B 1/227 244/119 |
| 2011/0086204 A1 | 4/2011 | Wohl, Jr. et al. | |
| 2011/0186685 A1 | 8/2011 | Tsotsis et al. | |
| 2012/0031147 A1 * | 2/2012 | Arai | B23K 26/0057 65/182.2 |
| 2013/0168826 A1 * | 7/2013 | Vineis | H01L 31/02363 257/618 |
| 2013/0337187 A1 | 12/2013 | Reh et al. | |
| 2014/0130318 A1 * | 5/2014 | Rohr | B32B 7/12 29/17.2 |
| 2014/0206473 A1 * | 7/2014 | Ripp | B21D 22/00 473/331 |
| 2014/0248469 A1 | 9/2014 | Rawlings et al. | |
| 2015/0053289 A1 * | 2/2015 | Kurtovic | B63B 1/36 137/814 |

FOREIGN PATENT DOCUMENTS

| | | |
|---|---|---|
| DE | 10 2013102181 | 5/2014 |
| WO | WO 2009/014425 | 1/2009 |

OTHER PUBLICATIONS

Lucas et al., "Femtosecond Laser Micromachining: A back-to-basics primer," Industrial Laser Solutions for Manufacturing (2012).

European Patent Office, Extended European Search Report, EP 16 18 7237 (dated Apr. 19, 2017).

China National Intellectual Property Administration, Office Action, with English translation, App. No. 2016110500582 (dated Aug. 16, 2019).

European Patent Office, "Communication pursuant to Article 94(3) EPC," App. No. 16 187 237.9 (dated May 21, 2019).

* cited by examiner

METHOD FOR PREPARING A FLUID FLOW SURFACE

FIELD

The present disclosure is generally related to fluid flow performance over a surface and, more particularly, to systems and method for preparing a fluid flow surface to reduce drag of a fluid flowing over the surface by machining riblets in the surface.

BACKGROUND

One approach to increasing fuel efficiency in modern vehicles, such as aircraft, is through improvement in aerodynamic performance. As one example, microstructures may be formed on fluid flow surfaces to reduce drag on the surface of the vehicle. Such microstructures may be used on areas where turbulent regions may be present to limit circulation causing a breakup of vortices in the turbulent regions near the fluid flow surface to reduce drag.

One current method of preparing a fluid flow surface to reduce drag is to apply a film having formed microstructures to one or more surfaces of the vehicle. However, such films may add considerable processing time to apply and/or remove, add unwanted additional weight, and are not cost effective. Further, such films may lack sufficient durability for extended use. For example, environmental effects and/or interaction with various chemicals, such as fuel, hydraulic fluid, etc., can degrade the microstructures, which may require replacement of the film.

Accordingly, those skilled in the art continue with research and development efforts in the field of preparing fluid flow surfaces to enhance fluid flow performance.

SUMMARY

In one example, the disclosed method for preparing a fluid flow surface may include the steps of: (1) producing a laser beam, (2) moving the laser beam across a surface of a work piece, and (3) machining a riblet in the surface by removing material from the surface, wherein the riblet includes a pair of ridges, wherein the pair of ridges is approximately parallel to each other, and each one of the ridges includes opposed sides, and a groove formed between facing ones of the sides and separating the ridges.

In another example, the disclosed system for preparing a fluid flow surface may include a laser to produce a laser beam, wherein the laser beam is movable across a surface of a work piece to machine a riblet in the surface, and the riblet is configured to reduce drag on a fluid flowing over the surface, and wherein the pair of ridges is approximately parallel to each other, and each one of the ridges includes opposed sides, and a groove formed between facing ones of the sides and separating the ridges.

In yet another example, the disclosed apparatus with enhanced fluid flow performance may include a structural layer, a surface coating layer applied to the structural layer, the surface coating layer defining a fluid flow surface of the apparatus, and a plurality of approximately parallel riblets formed in the surface coating layer, wherein each one of the riblets includes a pair of approximately parallel ridges, and a groove separating the ridges.

Other examples of the disclosed systems and methods will become apparent from the following detailed description, the accompanying drawings and the appended claims.

DETAILED DESCRIPTION

Figure 1:
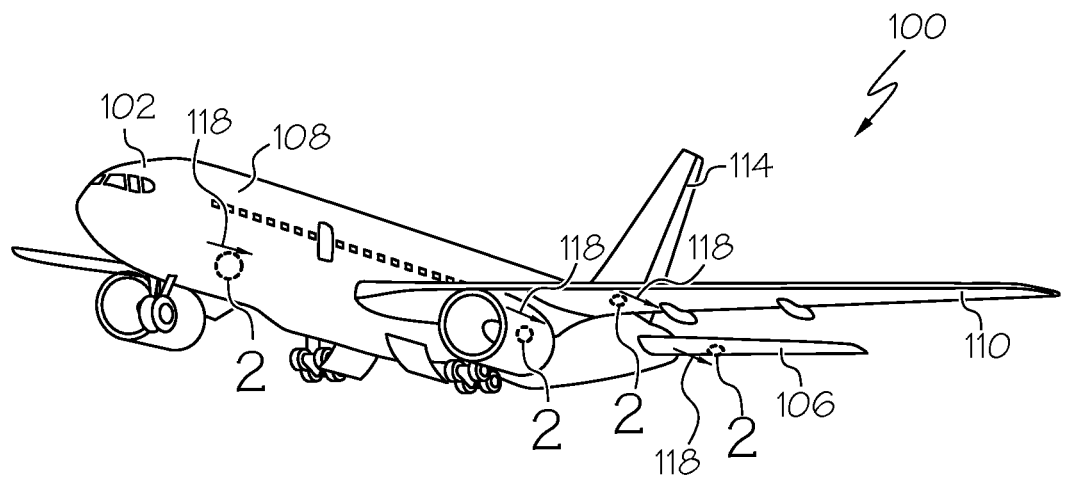
FIG. 1 is a schematic perspective view of one example of the disclosed vehicle.

The following detailed description refers to the accompanying drawings, which illustrate specific examples of the disclosure. Other examples having different structures and operations do not depart from the scope of the present disclosure. Like reference numerals may refer to the same element or component in the different drawings.

Figure 8:
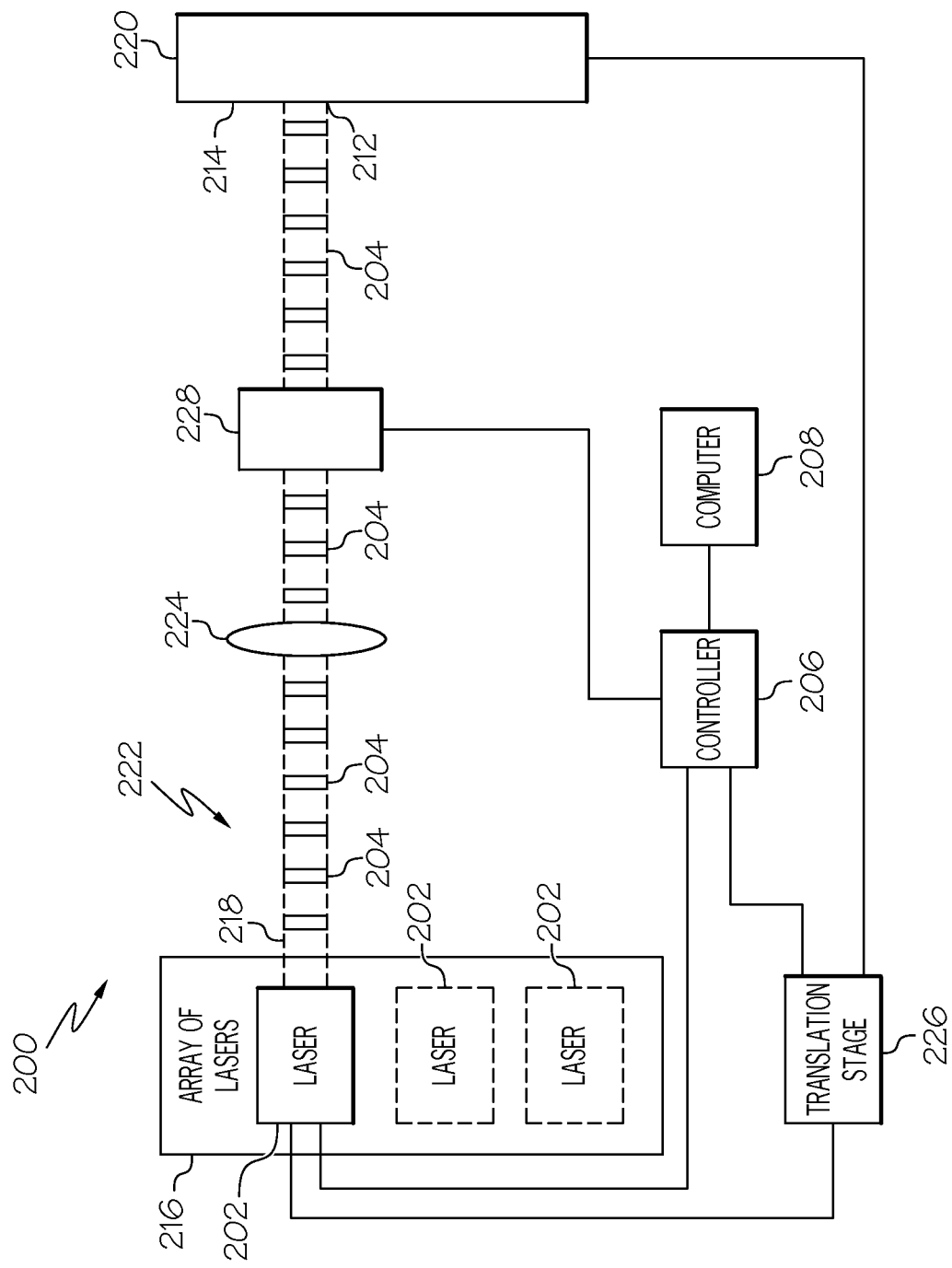
FIG. 8 is a schematic block diagram of one example of the disclosed system for preparing the fluid flow surface.
Figure 17:
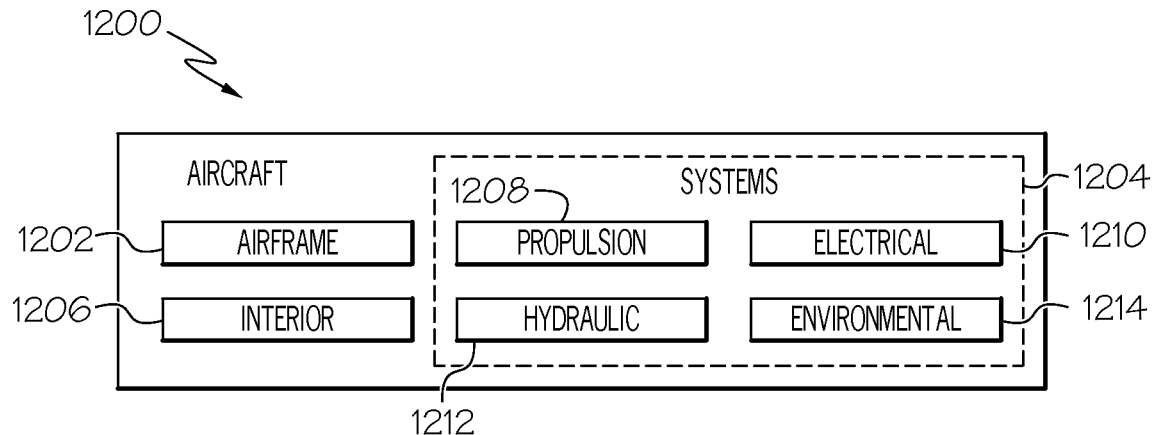
FIG. 17 is a schematic illustration of an aircraft.

In FIGS. 8 and 17, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 8 and 17 may be combined in various ways without the need to include other features described in FIGS. 8 and 17, other drawing figures, and/or the accompanying disclosure, even though such combination or combinations are not explicitly illustrated herein. Similarly, additional features not limited to the examples presented, may be combined with some or all of the features shown and described herein.

In FIGS. 12-16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12-16 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Reference herein to "example" means that one or more feature, structure, or characteristic described in connection with the example is included in at least one embodiment or implementation. The phrase "one example" or "another example" in various places in the specification may or may not be referring to the same example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Referring to FIG. 1, one example of vehicle 100 is disclosed. Vehicle 100 includes vehicle structure 104 (e.g., a vehicle body) with fluid flow surface 106. Fluid flow surface 106 may include any exterior surface of vehicle, or portion thereof, over which a fluid (e.g., a gaseous fluid or liquid fluid) flows.

As one example, vehicle 100 may be aircraft 102. Aircraft 102 may be any type of manned or unmanned air vehicle including, but not limited to, a fixed-wing aircraft, a rotary-wing aircraft, an unmanned aerial vehicle ("UAV"), a spacecraft, a missile, a rocket, and the like. Among other things, vehicle structure 104 of aircraft 102 may generally include fuselage 108, wings 110, a propulsion system, such as an engine having an engine nacelle (not explicitly identified), one or more stabilizers 114 (e.g., vertical and/or horizontal stabilizers), control surfaces (not explicitly illustrated), and the like. Fluid flow surface 106 may be a flat or curved surface exposed to and/or moving in air. As one example, fluid flow surface 106 may be, without limitation, any portion of the outer skin (not explicitly identified) of aircraft 102, such as a portion of fuselage 108, wings 110, stabilizers 114, the engine nacelle, the control surfaces, or other suitable surfaces of vehicle structure 104.

While fluid flow surface 106 is described and illustrated herein with respect to air vehicles (e.g., aircraft 102), the examples disclosed herein may be equally applicable for drag reduction in other types of vehicles such as land vehicles (e.g., cars, trucks, buses, trains, etc.) exposed to and/or moving in a gaseous fluid (e.g., air) or marine vehicles (e.g., boats, submarines, hydrofoils, fluid flow conduits, etc.) exposed to and/or moving through a liquid fluid (e.g., water).

Figure 2:
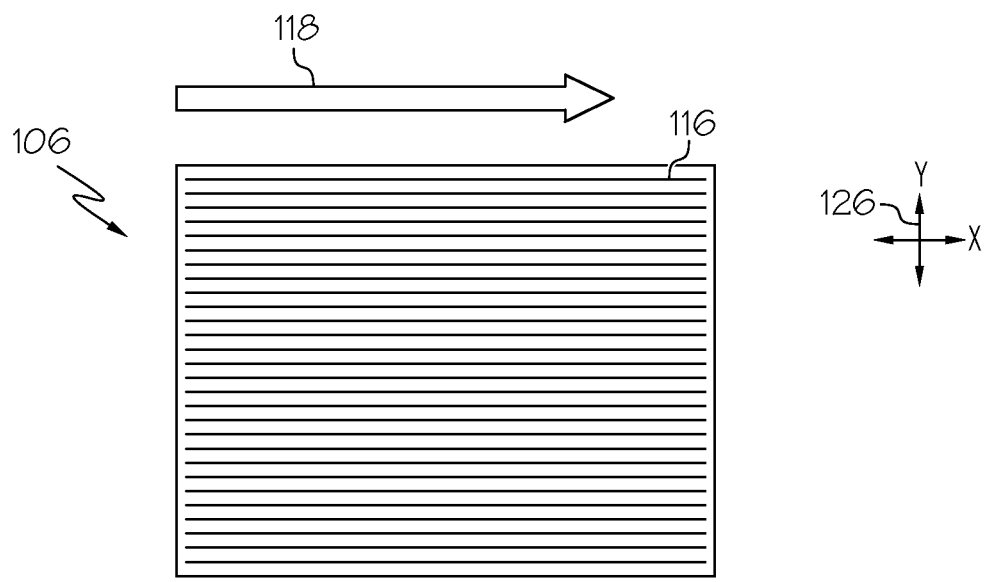
FIG. 2 is an enlarged schematic plan view of one example of the disclosed fluid flow surface of the vehicle of FIG. 1.
Figure 3:
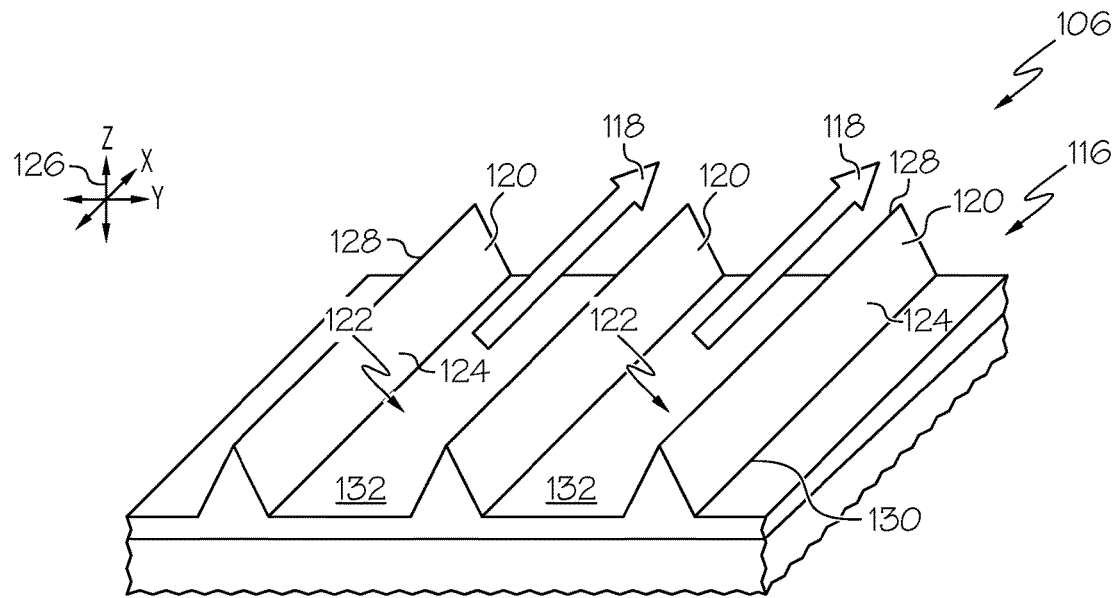
FIG. 3 is a schematic perspective view of one example of the disclosed riblets formed on the fluid flow surface.

Referring to FIGS. 2 and 3, and with reference to FIG. 1, one example of fluid flow surface 106 is disclosed. One or more areas or regions on fluid flow surface 106 of vehicle 100 (FIG. 1) may include riblets 116 (e.g., a plurality of riblets 116). Riblets 116 may be approximately or substantially parallel to each other. Riblets 116 may be arranged parallel to direction of fluid flow, as represented by arrow 118. Direction of fluid flow 118 may be approximately parallel to the X-axis of coordinate system 126 (or in the X-direction).

Throughout the present disclosure, fluid flow surface 106 and riblets 116 may be described with respect to three-dimensional coordinate system 126 (e.g., an XYZ coordinate system). For example, reference may be made to the spatial relationships between various features, elements, or components and/or to the spatial orientation or relative relationship of various aspects of features, elements, or components with respect to coordinate system 126, as depicted in the drawings. However, as will be recognized by those skilled in the art after a complete reading of the present disclosure, the features, elements, or components of the various examples described herein may be positioned in any desired orientation.

Riblets 116 may cover an entire section of structure 104 of aircraft 102 (e.g., the entire nose, the entire wing, etc.), or may cover only a portion of the section. The particular placement and area covered by riblets 116 may vary with the particular aircraft application. Generally, maximizing the coverage area of riblets 116 on fluid flow surface 116, optimizing the size and/or geometry of riblets 116, and/or optimizing the placement of riblets 116 on fluid flow surface 106 may achieve more reduction in drag. In other words, high percentage coverage of riblets 116 may lead to a high overall improvement in aerodynamic efficiency.

Generally, there may be no limitation to the total surface area of the exterior surface of structure 104 covered by riblets 116 (e.g., forming fluid flow surface 106). Preparing fluid flow surface 106 in accordance with the disclosed systems and methods may offer a flexible solution that achieves the highest possible coverage of riblets 116 and enables coverage in areas that may otherwise be difficult to prepare. However, as those skilled in the art will recognize, certain portions of a vehicle (e.g., aircraft 102) may not be suitable for application of riblets 116. As examples, areas prone to contamination or leading edges where fluid contacts a surface in approximately normal directions may be areas not suitable for riblet coverage.

Generally, and without being limited to any particular theory, the interaction of riblets 116 with the structure of a turbulent boundary layer of a fluid flowing over fluid flow surface 106 reduces the friction, resistance, or drag (e.g., drag coefficient ("Cd")) on fluid flow surface 106 moving in fluid, compared to an identical smooth surface without riblets. This reduction occurs despite an increase in "wetted area" (the surface area exposed to the fluid flow) of a riblet-covered surface over a smooth surface. As one example, approximately 80 percent coverage of aircraft 102 with the disclosed riblets 116 may lead to an approximately 2 percent to an approximately 10 percent reduction in drag.

Referring to FIG. 3, and with reference to FIGS. 1 and 2, riblets 116 generally form microstructures or a microscopic texture on fluid flow surface 106 (FIG. 2). As one example, riblets 116 may include a pattern or series of very small, alternating ridges 120 (e.g., ridge-like microstructures) and grooves 122 (e.g., groove-like microstructures) aligned approximately parallel to each other. Ridges 120 may extend or protrude outwardly from fluid flow surface 106. Grooves 122 may be formed between adjacent ridges 120. Ridges 120 and grooves 122 may extend along the X-axis of coordinate system 126 (or in the X-direction) and approximately parallel to direction of fluid flow 118 passing over fluid flow surface 106 of vehicle 100 (FIG. 1). Thus, each one of riblets 116 (also referred to herein as riblet 116) may be defined by a pair of adjacent and approximately parallel ridges 120 separated by one of grooves 122 (also referred to herein as groove 122). Alternatively, each riblet 116 may be defined by a pair of adjacent grooves 122 separated by one of ridges 120 (also referred to herein as ridge 120).

Referring to FIGS. 3-7, as one example, each one of ridges 120 may include opposed sides 124, peak 128, and base 130. As one example, each groove 122 may be formed by (e.g., between) facing sides 124 of adjacent ridges 120 and floor 132 extending continuously between the adjacent ridges 120. As one example, floor 132 of groove 122 may be a portion or section of fluid flow surface 106 extending between bases 130 of the facing sides 124 of the adjacent ridges 120.

Referring to FIGS. 4-7, and with reference to FIG. 3, as one example, each ridge 120 may have a height H (dimension in the Z-direction) and a width W (dimension in the Y-direction). Two adjacent ridges 120 may be separated by a center-to-center distance D (dimension in the Y-direction). As one example, the height H, width W, and center-to-center distance D of riblets 116 may be uniform along fluid flow surface 106. For instance, the geometry and/or cross-sectional shape of riblets 116 in the Y-Z plane may be constant in the X-direction. As one example, one or more of the height H, width W, and/or center-to-center distance D of riblets 116 may vary along fluid flow surface 106. For instance, the geometry and/or cross-sectional shape of riblets 116 in the Y-Z plane may vary in the X-direction.

Riblets 116 may have any suitable geometry and/or cross-sectional shape in the Y-Z plane. As examples, ridges 120 and/or grooves 122 may have any suitable geometry and/or cross-sectional shape in the Y-Z plane. Different geometries and/or cross-sectional shapes of riblets 116 may change the aerodynamic properties of fluid flow surface 106, for example, to further reduce drag. The particular geometry and/or cross-sectional shape of riblets 116 may be selected to suit a particular application.

Figure 4:
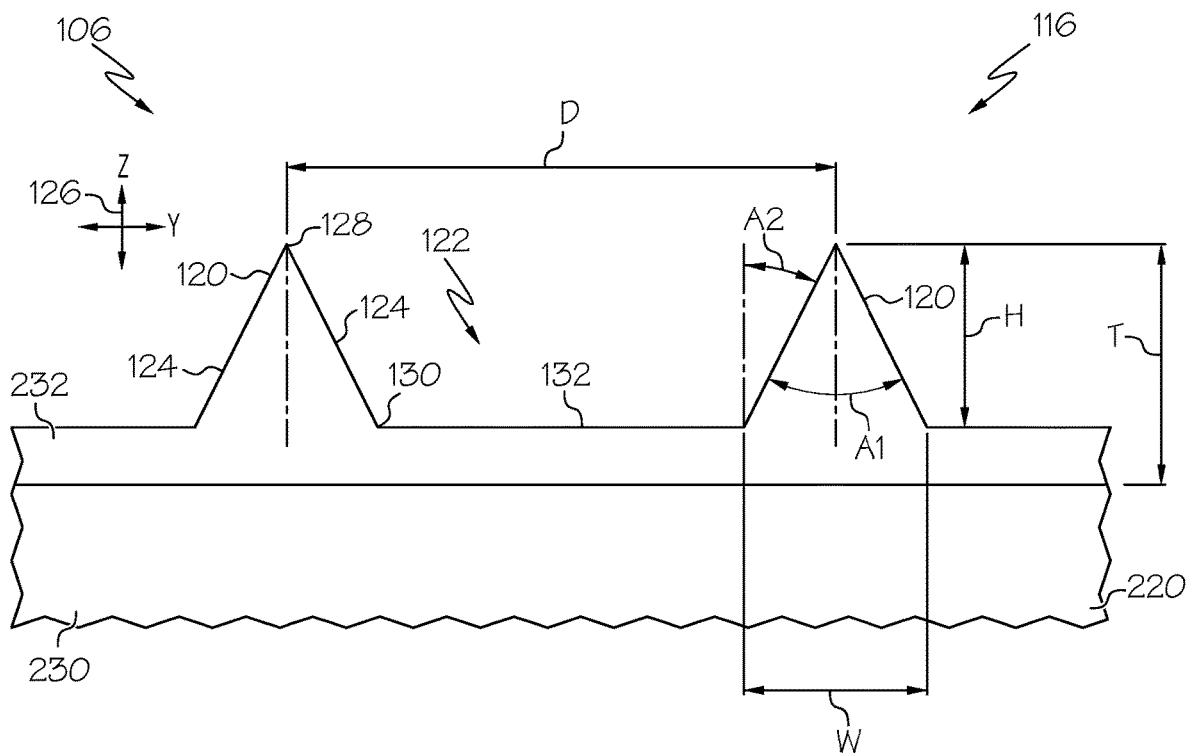
FIG. 4 is a schematic section view of one example of the disclosed riblets.

Referring to FIG. 4, as one specific, non-limiting example of the disclosed riblets 116, each ridge 120 may have a generally or approximately triangular cross-sectional shape in the Y-Z plane and each groove 122 may have a generally or approximately inverted trapezoidal cross-sectional shape in the Y-Z plane. For instance, ridges 12 and grooves 122 of riblets 116 may form a generally skiptooth pattern. Sides 124 of each ridge 120 may have an approximately flat shape in the Y-Z plane. Floor 132 may have an approximately flat shape in the Y-Z plane. The height H of ridge 120 may be a dimension from base 130 to peak 128. The width W of ridge 120 may be a maximum width of ridge 120, for example, at base 130. For instance the width of ridge 120, measured between sides 124 of ridge 120, may vary (e.g., decrease) from base 130 to peak 128. Sides 124 of each ridge 120 may be disposed at a non-zero first (e.g., interior peak) angle A1 relative to each other. Sides 124 of each ridge 120 may be inclined at a non-zero second (e.g., side inclination) angle A2 relative to the X-Z plane (e.g., normal to fluid flow surface 106). Peak 128 may terminate at a point formed by the intersection of inclined sides 124 of each ridge 120. The first angle A1 may define the second angle A2, for example, the second angle A2 may be approximately one-half of the first angle A1. The height H, width W, center-to-center distance D, and/or first angle A1 of riblets 116 may be preselected (e.g., optimized) to suit a particular application.

As specific, non-limiting implementations of the example illustrated in FIG. 4, the height H of riblets 116 (e.g., of ridges 120) may range from approximately 0.0015 inch (38.1 micrometers) to approximately 0.0016 inch (40.64 micrometers). As one specific, non-limiting implementation of the example illustrated in FIG. 4, the width W of riblets 116 (e.g., of ridges 120) may be approximately 0.0008 inch (20.32 micrometers). As specific, non-limiting implementations of the example illustrated in FIG. 4, the center-to-center distance D of riblets 116 (e.g., between adjacent ridges 120) may range from approximately 0.0029 inch (73.66 micrometers) to approximately 0.003 inch (76.2 micrometers). As specific, non-limiting implementations of the example illustrated in FIG. 4, the first angle A1 of riblets 116 (e.g., between sides 124 of ridge 120) may range from approximately 30 degrees to approximately 53 degrees. Correspondingly, as specific, non-limiting implementations of the example illustrated in FIG. 4, the second angle A2 of sides 124 of ridges 120 (e.g., between side 124 of ridge 120 and the X-Z plane) may range from approximately 15 degrees to approximately 26.5 degrees.

The example dimensions described above may be specific to a riblet profile optimized for a particular type of vehicle, a particular speed, a particular fluid, and the like (e.g., for an aircraft having a cruising speed of approximately 0.7 Mach to approximate 0.85 Mach). The dimensions of riblets 116 (e.g., height H, width W, center-to-center distance D, and/or first angle A1 of riblets 116) may widely vary for other types of vehicles, other types of fluid flowing over the fluid flow surface, the speed, etc.

Figure 5:
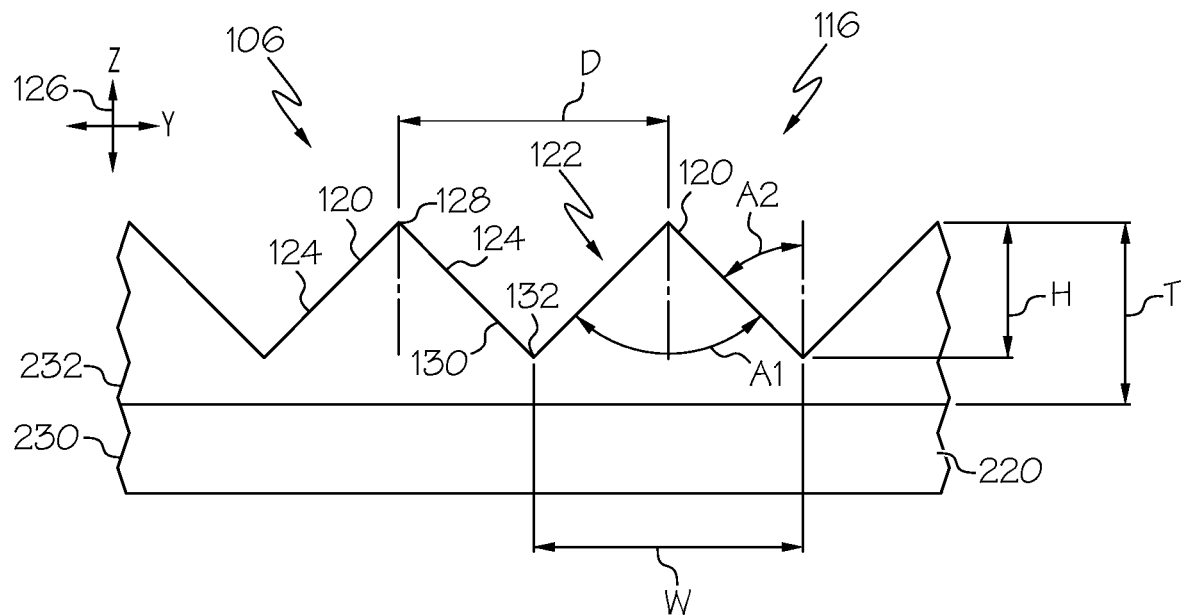
FIG. 5 is a schematic section view of one example of the disclosed riblets.

Referring to FIG. 5, as one specific, non-limiting example of the disclosed riblets 116, each ridge 120 may have a generally or approximately triangular cross-sectional shape in the Y-Z plane and each groove 122 may have a generally or approximately inverted triangular cross-sectional shape in the Y-Z plane. For instance, ridges 120 and grooves 122 of riblets 116 may form a generally sawtooth pattern. Sides 124 of each ridge 120 may have an approximately flat shape in the Y-Z plane. The height H of ridge 120 may be the dimension from base 130 to peak 128. The width W of ridge 120 may be a maximum width of ridge 120, for example, at base 130. For instance the width of ridge 120, measured between sides 124 of ridge 120, may vary (e.g., decrease) from base 130 to peak 128. Sides 124 of each ridge 120 may be disposed at the non-zero first angle A1 relative to each other. Sides 124 of each ridge 120 may be inclined at the non-zero second angle A2 relative to X-Z plane. Peak 128 may terminate at a point formed by the intersection of inclined sides 124 of each ridge 120. Floor 132 may form a point at the intersection of facing inclined sides 124 of adjacent ridges 120 at base 130. The first angle A1 may define the second angle A2, for example, the second angle A2 may be approximately one-half of the first angle A1. The height H, width W, center-to-center distance D, and/or first angle A1 of riblets 116 may be preselected (e.g., optimized) to suit a particular application.

As one specific, non-limiting implementation of the example illustrated in FIG. 5, the height H of riblets 116 (e.g., of ridges 120) may be approximately 0.0023 inch (58.42 micrometers). As one specific, non-limiting implementation of the example illustrated in FIG. 5, the width W of riblets 116 (e.g., of ridges 120) may be approximately 0.0023 inch (58.42 micrometers). As one specific, non-limiting implementation of the example illustrated in FIG. 5, the center-to-center distance D of riblets 116 (e.g., between adjacent ridges 120) may be approximately 0.0024 inch (60.96 micrometers). As specific, non-limiting implementations of the example illustrated in FIG. 5, the first angle A1 of riblets 116 (e.g., between sides 124 of ridge 120) may range from approximately 53 degrees to approximately 90 degrees. Correspondingly, as specific, non-limiting implementations of the example illustrated in FIG. 5, the second angle A2 of sides 124 of ridges 120 (e.g., between side 124 of ridge 120 and the X-Z plane) may range from approximately 26.5 degrees to approximately 45 degrees. As one specific, non-limiting implementation of the example illustrated in FIG. 5, a ratio between the height H and the center-to-center distance D (H-to-D ratio or H/D) may range from approximately 0.5 to approximately 0.98. For instance, H/D may be approximately 0.5, approximately 0.86, or approximately 0.98.

The example dimensions described above may be specific to a riblet profile optimized for a particular type of vehicle, a particular speed, a particular fluid, and the like. The dimensions of riblets 116 (e.g., height H, width W, center-to-center distance D, and/or first angle A1 of riblets 116) may widely vary for other types of vehicles, other types of fluid flowing over the fluid flow surface, the speed, etc.

Figure 6:
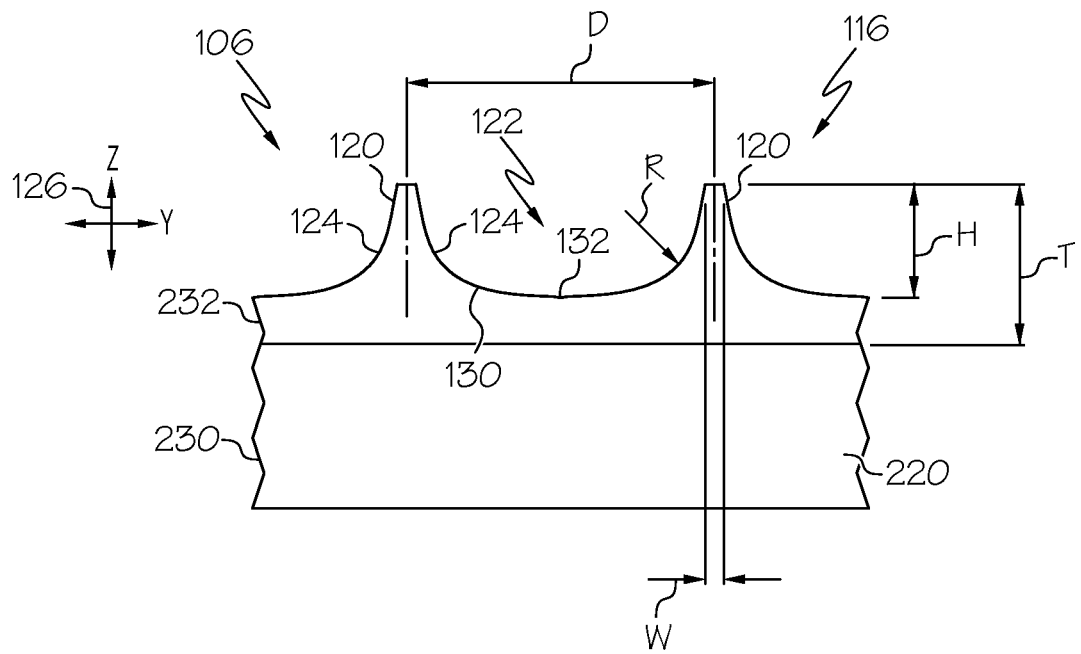
FIG. 6 is a schematic section view of one example of the disclosed riblets.

Referring to FIG. 6, as one specific, non-limiting example of the disclosed riblets 116, each ridge 120 may have a generally or approximately triangular cross-sectional shape in the Y-Z plane and each groove 122 may have a generally or approximately U-shaped cross-sectional shape in the Y-Z plane. Alternatively (not explicitly illustrated), each groove 122 may have a generally or approximately semicircular or semi-ovular cross-sectional shape in the Y-Z plane. Sides 124 of each ridge 120 may have an approximately curved shape in the Y-Z plane. Floor 132 may have an approximately curved shape in the Y-Z plane. Alternatively (not explicitly illustrated), floor 132 may have an approximately flat shape in the Y-Z plane. The height H of ridge 120 may be the dimension from base 130 to peak 128. The width W of ridge 120 may be a minimum width of ridge 120, for example, at peak 128. For instance the width of ridge 120, measured between sides 124 of ridge 120, may vary (e.g., increase) from peak 128 to base 130. Sides 124 of each ridge 120 may have a radius R. Peak 128 may have an approximately flat shape in the Y-Z plane. Alternatively (not explicitly illustrated), peak 128 may have an approximately curved or rounded shape in the Y-Z plane. The height H, width W, center-to-center distance D, and/or radius R of riblets 116 may be preselected (e.g., optimized) to suit a particular application.

As one specific, non-limiting implementation of the example illustrated in FIG. 6, a ratio between the height H and the center-to-center distance D (H-to-D ratio or H/D) may range from approximately 0.5 to approximately 1.0. For instance, H/D may be approximately 0.5, approximately 0.7, or approximately 1.0. As one specific, non-limiting implementation of the example illustrated in FIG. 6, a ratio between the width W and the center-to-center distance D (W-to-D ratio or W/D) may range from approximately 0.02 to approximately 0.04.

Figure 7:
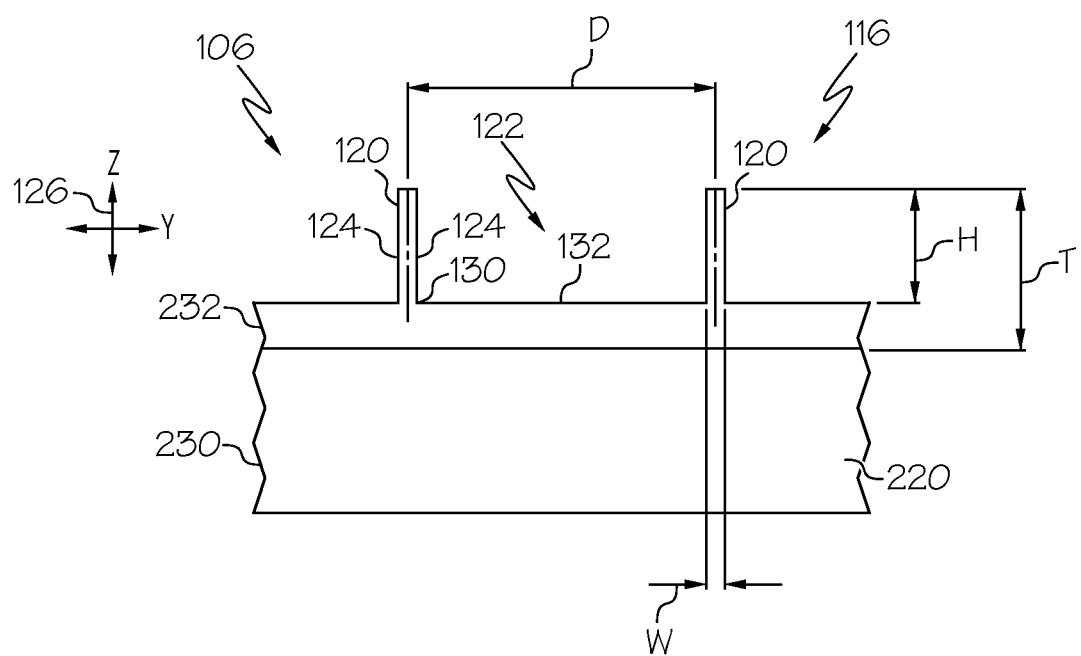
FIG. 7 is a schematic section view of one example of the disclosed riblets.

Referring to FIG. 7, as one specific, non-limiting example of the disclosed riblets 116, each ridge 120 may have a generally or approximately rectangular cross-sectional shape in the Y-Z plane and each groove 122 may have a generally or approximately rectangular cross-sectional shape in the Y-Z plane. Alternately (not explicitly illustrated), each groove 122 may have a generally or approximately square cross-sectional shape in the Y-Z plane. Sides 124 of each ridge 120 may have an approximately flat shape in the Y-Z plane. Floor 132 may have an approximately flat shape in the Y-Z plane. The height H of ridge 120 may be the dimension from base 130 to peak 128. The width W of ridge 120 may be constant from base 130 to peak 128. The height H, width W, and/or center-to-center distance D of riblets 116 may be preselected (e.g., optimized) to suit a particular application.

As one specific, non-limiting implementation of the example illustrated in FIG. 7, a ratio between the height H and the center-to-center distance D (H-to-D ratio or H/D) may range from approximately 0.2 to approximately 0.8. As one specific, non-limiting implementation of the example illustrated in FIG. 7, a ratio between the width W and the center-to-center distance D (W-to-D ratio or W/D) may range from approximately 0.02 to approximately 0.04.

Referring to FIG. 8, one example of system 200 for preparing fluid flow surface 106 is disclosed. System 200 may be used to form or machine riblets 116 on or into fluid flow surface 106 to enhance fluid flow performance of (e.g., reduce drag on a fluid flowing over) fluid flow surface 106. Generally, system 200 may be utilized for laser modification or laser micromachining of fluid flow surface 106 to have riblets 116, rather than fluid flow surface 106 being smooth.

System 200 includes at least one laser 202. Laser 202 generates laser beam 218. System 200 positions light of laser beam 218 emitted from laser 202 on surface 214 of work piece 220 to machine riblets 116 in surface 214. Surface 214 of work piece 220 is generally a smooth surface over which a fluid will flow when work piece 220 is in use for a particular application. Thus, surface 214 may also be referred to as a fluid flow surface in which riblets 116 are machined by system 200.

Laser 202 may be a pulsed laser configured to emit a pulsed laser beam 218. Thus, laser beam 218 may include laser pulses 204. As one example, laser 202 may be a diode pumped solid state laser that operates with adjustable repetition or pulse rates, pulse energies, and pulse durations. Laser beam 218 may have various pulse widths, wave lengths, pulse repetition rates, and pulse energy appropriate for the particular micromachining task, for example, based on the geometry of riblets 116.

As one example, laser 202 may be an ultrafast or ultra-short-pulse ("USP") laser providing ultrafast pulses. As used herein, the term "ultrafast laser" refers to nanosecond lasers, femtosecond lasers, and picosecond lasers. The specific type of laser may depend on various factors, such as the type of material upon which riblets 116 are formed (e.g., the type of material of work piece 220). Femtosecond lasers and picosecond lasers may be preferred in certain applications for higher quality machining. As one example, laser 202 may provide ultrafast laser pulses 204 (e.g., pulsed laser beam 218) having a pulse duration measured in picoseconds, for example, less than approximately ten picoseconds, (e.g., picosecond pulses) or femtoseconds (e.g., femtosecond pulses). For instance, laser 202 may provide laser pulses 204 (e.g., emit pulsed laser beam 218) having a pulse duration measured in the 1-999 femtosecond range. Thus, laser 202 may be a femtosecond laser utilized for micromachining grooves 122 in fluid flow surface 106 to form riblets 116.

Ultrafast pulses of light (e.g., laser pulses 204) emitted by laser 202 interact with target material, for example, on surface 214 of work piece 220, in a manner that is different from the way traditional lasers, such as a continuous wave laser or laser pulses having a pulse duration measured in nanoseconds or more, interact with the same material. Generally, ultrafast laser pulses 204 (e.g., pulsed laser beam 218) deposit energy in target material at such high speeds that the energy does not have time to leak away via mechanisms like thermal conduction. Laser 202 directs and deposits a large amount of energy (e.g., between approximately 1 nJ to approximately 1 mJ, or between approximately 1 Gigawatts to approximately 10 Gigawatts of peak power) through pulsed laser beam 218 in target material so fast (e.g., in femtoseconds) that target material, for example, a portion of surface 214 of work piece 220, at a focal point of pulsed laser beam 218 (referred to herein as spot 212 of pulsed laser beam 218) is forced into a plasma state. The plasma then expands away from work piece 220 as a highly energetic gas, taking almost all of the generated heat with it. In other words, target material at spot 212 located on work piece 220 essentially transforms from a solid to a gas phase without first going through a melt phase. Consequently, very little heat is left behind to damage work piece 220 proximate (e.g., at or near) spot 212 and very precise microstructures (e.g., riblets 116) may be machined on surface 214 of work piece 220 or at least partially through work piece 220. The reduced thermal impact on the work piece material also eliminates material degradation and, thus, the original material performance is preserved.

As one specific, non-limiting example, laser 202 may be a carbon dioxide ("$CO_2$") laser. As one specific, non-limiting example, laser 202 may be an ultraviolet ("UV") laser. As one specific, non-limiting example, laser 202 may be an infrared ("IR") laser. As one specific, non-limiting example, laser 202 may be a titanium-doped sapphire ("Ti:Sapphire") laser.

As one example, laser 202 may be a pulsed solid-state laser with a gain media including, but not limited to titanium-doped sapphire ("Ti:Sapphire") (e.g., a Ti:Sapphire laser), ytterbium-doped yttrium aluminum garnet ("Yb:YAG") (e.g., a Yb:YAG laser), ytterbium-doped potassium gadolinium tungstate ("Yb:KGW") (e.g., a Yb:KGW laser), or ytterbium-doped potassium yttrium tungstate ("Yb:KYW") (e.g., a Yb:KYW laser).

Referring to FIG. 8, and with reference to FIGS. 1-3, as one example, work piece 220 may be vehicle 100 (e.g., aircraft 102) or a portion or section of vehicle 100 (e.g., wing 110, fuselage 108, etc. of aircraft 102) and surface 214 of work piece 220 may be fluid flow surface 106 of vehicle 100 (FIG. 1). As one example, work piece 220 may be an exterior skin panel (not explicitly illustrated) used to form vehicle structure 104 (e.g., a skin panel used to form wing 110, fuselage 108, etc.) and surface 214 of work piece 220 may be fluid flow surface 106 of the exterior skin panel. In other words, work piece 220 may be relatively small, such as a component of a larger structure (e.g., a skin panel), or may be relatively large, such as an entire vehicle 100. A portion of surface 214 of work piece 220 that is exposed to a fluid flow or moves in a fluid during a particular application is fluid flow surface 106.

Referring to FIG. 8, when laser beam 218 exits laser 202, it travels along optical path 222 and is delivered to surface 214 of work piece 220. In one example, along optical path 222, laser beam 218 may pass through optics 224. Optics 224 may expand laser beam 218, focus laser beam 218, or otherwise modify laser beam 218. Optics 224 may include one or more lenses or other suitable laser optics device or mechanism. As one example, optics 224 may be used to change a size of spot 212 (e.g., increase or decrease the spot size S) (FIG. 9) of laser beam 218 incident on surface 214 of work piece 220. Optionally, system 200 may also include one or more mirrors (not explicitly illustrated) to direct laser beam 218 along optical path 222.

Referring to FIG. 8, and with reference to FIGS. 3-7 and 9-11, generally, system 200 is configured to direct laser beam 218 to surface 214 of work piece 220 and move laser beam 218 across surface 214 to form riblets 116 (FIG. 3) on work piece 220, for example, to prepare fluid flow surface 106 (FIG. 3). As one example, system 200 may utilize a single laser 202 and a single laser beam 218 to form riblets 116. As one example, system 200 may utilize a single laser 202 and a plurality of laser beams 218 to form riblets 116. For instance, optics 224 may also include a beam splitter (not explicitly illustrated) configured to split laser beam 218 into a plurality of sub-beams (not explicitly illustrated). As one example, system 200 may utilize a plurality of laser beams 202, for example, forming array of lasers 216, to form riblets 116.

In one example implementation, each one of riblets 116 may be machined individually and consecutively, for example, by a single laser beam 218 from a single laser 202. In one example implementation, a plurality of riblets 116 may be machined simultaneously, for example, by a plurality of laser beams 218 from a single laser 202 or a plurality of laser beams 218 from a plurality of lasers 202 (e.g., array of lasers 216).

Figure 9:
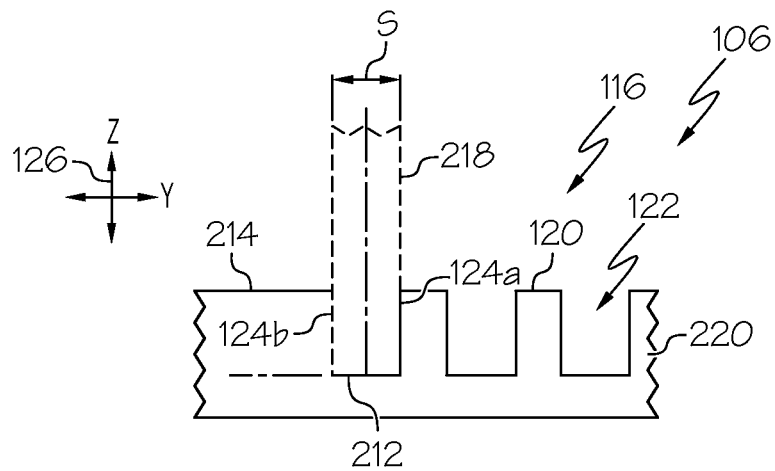
FIG. 9 is a schematic section view of one example of a laser micromachining the riblets of FIG. 7 on the fluid flow surface.
Figure 10:
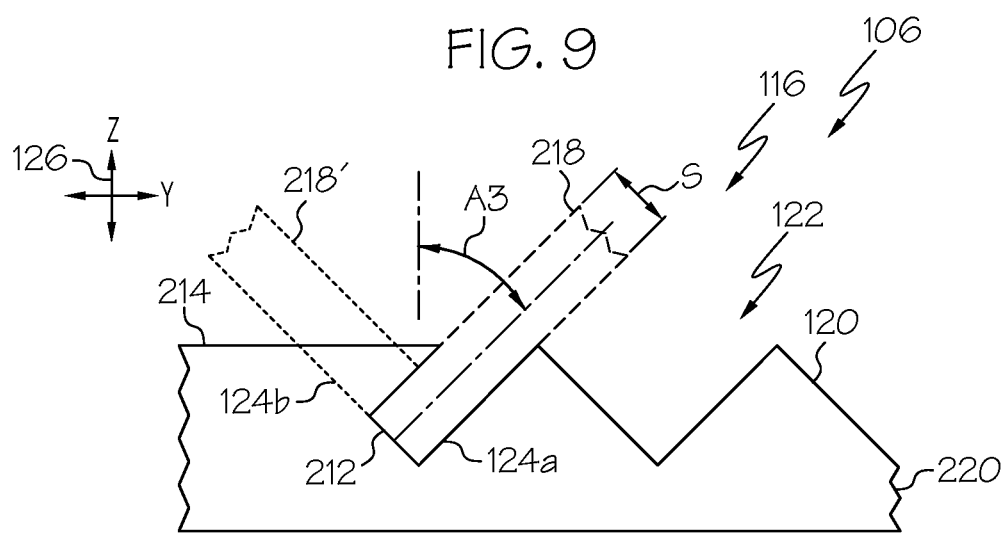
FIG. 10 is a schematic section view of one example of the laser micromachining the riblets of FIG. 5 on the fluid flow surface.
Figure 11:
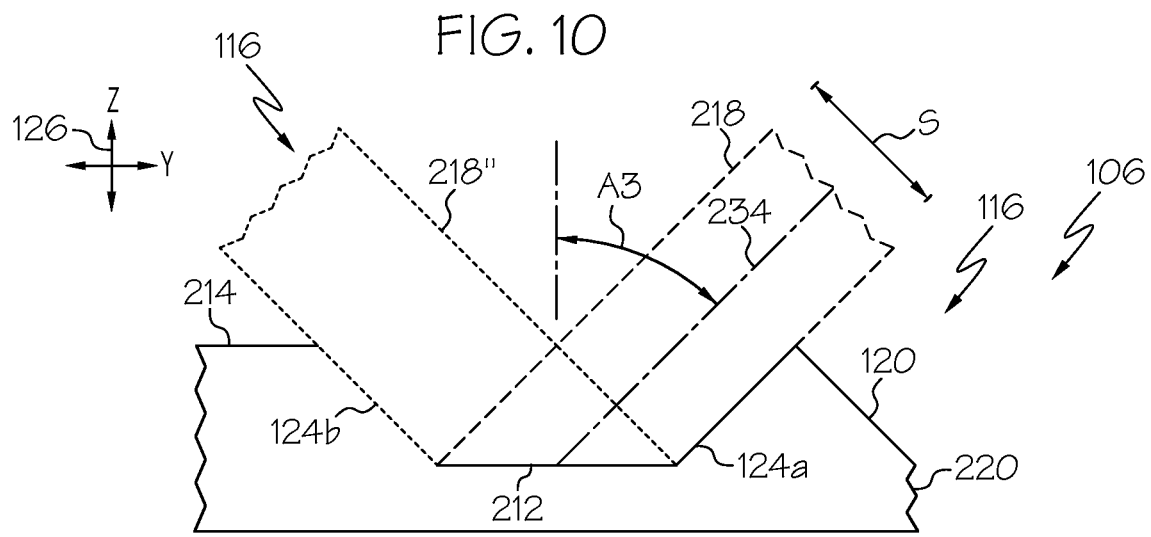
FIG. 11 is a schematic section view of one example of the laser micromachining the riblets of FIG. 4 on the fluid flow surface.

Referring to FIGS. 9-11, and with reference to FIG. 8, system 200 may utilize various mechanisms to direct and/or steer laser beam 218 along surface 214 of work piece 220. As one example, system 200 may translate laser beam 218 in the X-direction, the Y-direction, and/or the Z-direction, for example, relative to work piece 220, to form riblets 116. As one example, system 200 may also position (e.g., rotate)

laser beam 218 (e.g., center line 234 of laser beam 218) to various non-zero third (e.g., incident) angles A3 (FIGS. 9-11) relative to the X-Z plane (e.g., normal to fluid flow surface 106).

Laser beam 218 forms or machines (e.g., laser machines or laser engraves) grooves 122 of riblets 116 into surface 214 of work piece 220 to prepare fluid flow surface 106. The machined grooves 122 thereby form of define ridges 120 of riblets 116. As one example, riblet 116 (e.g., a pair of adjacent ridges 120 and groove 122) may be completely formed by a single pass or run of laser beam 218. As one example, riblet 116 may be only partially formed by a single pass or run and, thus, multiple passes or runs of laser beam 218 may be needed to completely form riblet 116. The number of runs of laser beam 218 needed to completely form riblet 116 may depend on various factors including, but not limited to, the geometry and/or cross-sectional shape of riblets 116 (e.g., of ridges 120 and grooves 122), a spot size S (e.g., a cross-sectional dimension or diameter) (FIG. 9) of spot 212 of laser beam 218, the type of laser 202, the frequency of laser 202, the intensity of laser 202, the duration of time that work piece 220 is exposed to laser beam 218, and the like.

Referring to FIG. 9, and with reference to FIG. 7, as one example, laser beam 218 may be positioned to incident with surface 214 of work piece 220 approximately normal to fluid flow surface 106 (e.g., such that the third angle A3 is approximately 0 degrees) in order to at least partially machine groove 122 having an approximately rectangular or square cross-sectional shape in the Y-Z plane and form sides 124 of ridge 120 having an approximately flat shape in the Y-Z plane, such as the example riblets 116 illustrated in FIG. 7. The width of groove 122 may be dictated by center-to-center distance D (FIG. 7). As one example, increasing spot size S may increase the width of groove 122, for example, to complete machining of groove 122 as needed. As one example, moving or repositioning laser beam 218 in the Y-direction may increase the width of groove 122, for example, to complete machining of groove 122 as needed. Moving laser beam 218 in the X-direction completes the length of riblet 116.

Referring to FIG. 10, and with reference to FIG. 5, as one example, laser beam 218 may be positioned to incident with surface 214 of work piece 220 at the third angle A3 in order to partially machine groove 122 having an approximately inverted triangular cross-sectional shape in the Y-Z plane and form one of sides 124 of ridge 120 having an approximately flat shape in the Y-Z plane and being inclined at the second angle A2, such as the example riblets 116 illustrated in FIG. 5. The third angle A3 is dictated by the second angle A2, for example, the third angle A3 is approximately equal to the second angle A2. As one example, increasing spot size S may complete the machining of groove 122 and form the facing side 124 of an adjacent ridge 120. As one example, moving or repositioning laser beam 218 in the Y-direction and Z-direction may complete the machining of groove 122 and form the facing side 124 of an adjacent ridge 120. As one example, and as illustrated in FIG. 10, at least one additional run of laser beam 218' repositioned at an appropriate position in the Y-direction and at a complimentary third angle A3 may complete the machining of groove 122 and form the facing side 124 of an adjacent ridge 120. As one example (not explicitly illustrated), two laser beams 218 (e.g., laser beams 218 and 218') may simultaneously and completely machine groove 122 and form both facing sides 124 of adjacent ridges 120.

Referring to FIG. 11, and with reference to FIG. 4, as one example, laser beam 218 may be positioned to incident with surface 214 of work piece 220 at the third angle A3 in order to partially machine groove 122 having an approximately inverted trapezoidal cross-sectional shape in the Y-Z plane and form one of sides 124 of ridge 120 having an approximately flat shape in the Y-Z plane and being inclined at the second angle A2, such as the example riblets 116 illustrated in FIG. 4. The third angle A3 is dictated by the second angle A2, for example, the third angle A3 is approximately equal to the second angle A2. As one example, increasing spot size S may complete the machining of groove 122 and form the facing side 124 of an adjacent ridge 120. As one example, moving or repositioning laser beam 218 in the Y-direction and Z-direction may complete the machining of groove 122 and form the facing side 124 of an adjacent ridge 120. As one example (not explicitly illustrated), at least one additional run of laser beam 218 repositioned at an appropriate position in the Y-direction and at a complimentary third angle A3 may complete the machining of groove 122 and form the facing side 124 of an adjacent ridge 120. As one example, and as illustrated in FIG. 11, two laser beams 218 (e.g., laser beam 218 and laser beam 218") may simultaneously completely machine groove 122 and form both facing sides 124 of adjacent ridges 120.

In other examples, laser beam 218 or two or more laser beams 218 may be appropriately positioned incident with surface 214 of work piece 220 in order to partially or completely machine groove 122 having other cross-sectional shapes in the Y-Z plane (e.g., U-shaped, semicircular shaped, semi-ovular shaped, etc.) and form one or both facing sides 124 of adjacent ridges 120 having approximately curved shapes in the Y-Z plane, such as the example riblets 116 illustrated in FIG. 6.

Thus, in one example implementation, and as illustrated in FIG. 9, a single laser beam 218 may be positioned at an appropriate third (e.g., incident) angle A3 (not illustrated in FIG. 9) and an appropriate location in the Y-direction to completely machine groove 122 having a preselected geometry and form the facing ones of sides 124 (e.g., first facing side 124a and second facing side 124b) having a preselected geometry. Laser beam 218 may move across surface 214 in the X-direction to extend groove 122 and form riblet 116 longitudinally. Laser beam 218 may move across surface 214 in the Y-direction to machine additional approximately parallel grooves 122 and form additional approximately parallel riblets 116.

In another example implementation, and as illustrated in FIG. 10, a single laser beam 218 may be positioned at an appropriate third angle A3 and an appropriate location in the Y-direction to partially machine groove 122 having a preselected geometry and form one of the facing ones of sides 124 (e.g., first facing side 124a) having a preselected geometry. Laser beam 218 may be subsequently repositioned at an appropriate third angle A3 and an appropriate location in the Y-direction (identified in FIG. 10 as repositioned laser beam 218') to completely machine groove 122 and form another one of the facing ones of sides 124 (e.g., second facing side 124b). Laser beam 218 may move across surface 214 in the X-direction to extend groove 122 and form riblet 116 longitudinally. Laser beam 218 may move across surface 214 in the Y-direction to machine additional approximately parallel grooves 122 and form additional approximately parallel riblets 116.

In yet another example implementation, and as illustrated in FIG. 11, a plurality of (e.g., two) laser beams 218 (e.g., first laser beam 218 and second laser beam 218") may be simultaneously positioned at appropriate third angles A3 and appropriate locations in the Y-direction to completely machine groove 122 having a preselected geometry and form both facing ones of sides 124 (e.g., first facing side 124*a* and second facing side 124*b*) having a preselected geometry. Laser beams 218 and 218" may move across surface 214 in the X-direction to extend groove 122 and form riblet 116 longitudinally. Laser beams 218 and 218" may move across surface 214 in the Y-direction to machine additional approximately parallel grooves 122 and form additional approximately parallel riblets 116.

Referring to FIG. 8, and with reference to FIGS. 9-11, as one example, system 200 may include scanner 228. While travelling along optical path 222, laser beam 218 may enter and pass through scanner 228. Scanner 228 may be any device suitable to provide controlled deflection, direction, and/or steering of laser beam 218. Scanner 228 may translate laser beam 218 in the X-direction and/or the Y-direction to form riblets 116. Scanner 228 may also position (e.g., direct) laser beam 218 to a predetermined third angle A3 (FIGS. 9-11) relative to the X-Y plane to form riblets 116. In examples where system 200 includes a plurality of lasers 202 (e.g., array of lasers 216) generating a plurality of laser beams 218 or where laser beam 218 from a single laser 202 is split into a plurality of laser beams 218 (e.g., sub-beams), all of the plurality of laser beams 218 may be directed and/or steered by one or more associated scanners 228.

As one example, system 200 may include translation stage 226. Translation stage 226 may be operatively coupled to laser 202 to move laser 202 and, thus, laser beam 218, in the X-direction, Y-direction, and/or Z-direction relative to work piece 220 and/or position laser 202 to direct laser beam 218 at third angle A3. Similarly, translation stage 226 may be operatively coupled to each one of the plurality of lasers 202 (e.g., to array of lasers 216) to move the plurality of lasers 202 and, thus, the plurality of laser beams 218, in the X-direction, Y-direction, and/or Z-direction relative to work piece 220 and/or position the plurality of lasers 202 to direct the plurality of laser beams 218 at appropriate third angles A3. Alternatively, or additionally, translation stage 226 may be operatively coupled to work piece 220 to move work piece 220 in the X-direction, Y-direction, and/or Z-direction relative to laser beam 218 and/or position work piece 220 at third angle A3 relative to laser beam 218.

Referring to FIG. 8, as one example, system 200 may also include computer 208 for driving and controlling laser 202. Controller 206 may provide control and feed-back between computer 208 driving laser 202. As those skilled in the art will recognize, the electronic feed-back loop may allow for automated operation of laser 202. Computer 208 may also control movement of translation stage 226 via controller 206. Computer 208 may also control scanner 228 to direct and/or steer laser beam 218 via controller 206. Computer 208 also controls laser 202 by turning it on and off as needed via controller 206.

Referring to FIGS. 4-7, as one example, work piece 220 may include multiple layers of material. As one example, work piece 220 may include at least one structural layer 230 and at least one surface coating layer 232. As one specific, non-limiting example, such as when work piece 220 is a portion of an exterior surface of aircraft 102 (FIG. 1), structural layer 230 may be a carbon fiber-reinforced polymer ("CFRP") and surface coating layer 232 may be a protective coating, a paint coating, a topcoat, or the like applied to a surface of structural layer 230. While work piece 220 is illustrated having only one structural layer 230 and one surface coating layer 232 in FIGS. 4-7, work piece 220 may also include additional structural layers 230 and/or additional intermediate layers disposed between structural layer 230 and surface coating layer 232 (not explicitly illustrated).

In one example implementation, riblets 116 may be laser micromachined in only surface coating layer 232. As one example, surface coating layer 232 may include a thickness T. Laser 202 (FIG. 8) may be used to micromachine (e.g., form) grooves 122 in surface coating layer 232 by removing (e.g., vaporizing, fracturing, and/or flaking) target material from a portion of thickness T of the of surface coating layer 232 to form ridges 120. In one example, work piece 220 may include a plurality of surface coating layers 232 (not explicitly illustrated). In one example implementation, riblets 116 may be machined in an outermost one of the plurality of surface coating layers 232.

Accordingly, system 200 may be used to form very detailed microstructures (e.g., riblets 116) in surface 214 of work piece 220, for example, in surface coating layer 232, at very high processing speeds. For example, system 200 may utilize one or more lasers 202 to prepare fluid flow surface 106 by laser machining or laser engraving riblets 116 in surface of work piece 220 in order to reduce drag on fluid flow surface 106, for example when vehicle 100 is travelling at high speeds. The use of a plurality of lasers 202 (e.g., array of lasers 216) may allow for very large surface areas to be prepared very quickly. For example, array of lasers 216 may form riblets 116 on appropriate portions of the exterior surface of an entire aircraft 102.

Figure 12:
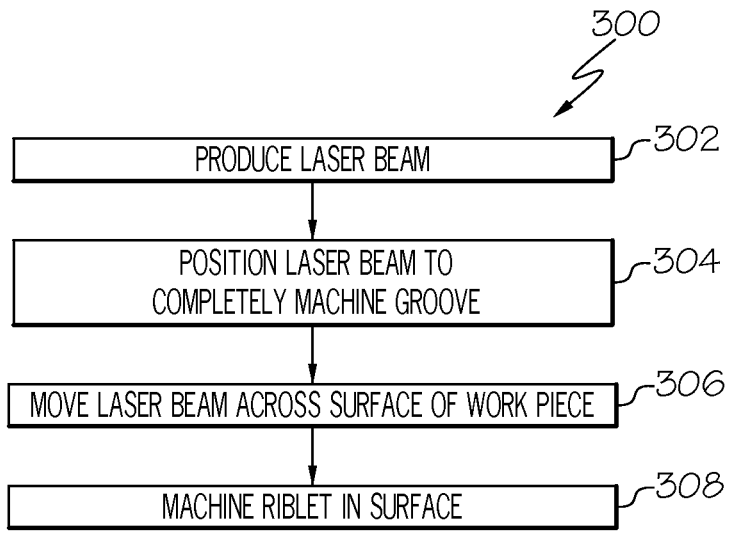
FIG. 12 is a flow diagram of one example of the disclosed method for preparing the fluid flow surface.

Referring to FIG. 12, and with reference to FIGS. 8 and 9, one example of method 300 is disclosed. Method 300 is one example implementation of the disclosed method for preparing fluid flow surface 106 utilizing system 200. Modifications, additions, or omissions may be made to method 300 without departing from the scope of the present disclosure. Method 300 may include more, fewer, or other steps. Additionally, steps may be performed in any suitable order.

As shown at block 302, method 300 may include the step of producing laser beam 218. As shown at block 304, laser beam 218 is positioned to completely machine groove 122 in surface 214 of work piece 220 and form both of the facing ones of sides 124 of ridge 120. As shown at block 306, laser beam 218 is moved across surface 214. As shown at block 308, riblet 116 is machined in surface 214 by removing material from surface 214 by laser beam 218.

Figure 13:
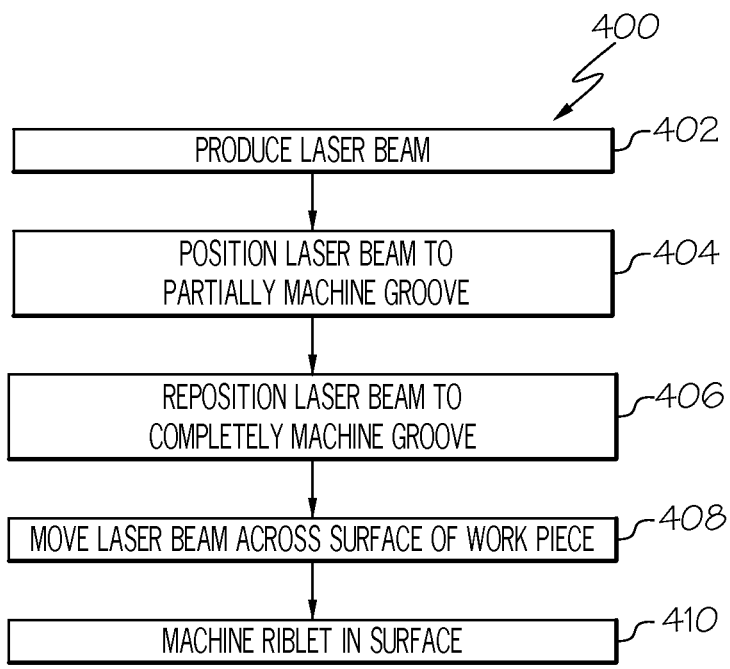
FIG. 13 is a flow diagram of one example of the disclosed method for preparing the fluid flow surface.

Referring to FIG. 13, and with reference to FIGS. 8 and 10, one example of method 400 is disclosed. Method 400 is one example implementation of the disclosed method for preparing fluid flow surface 106 utilizing system 200. Modifications, additions, or omissions may be made to method 400 without departing from the scope of the present disclosure. Method 400 may include more, fewer, or other steps. Additionally, steps may be performed in any suitable order.

As shown at block 402, method 400 may include the step of producing laser beam 218. As shown at block 404, laser beam 218 is positioned to partially machine groove 122 in surface 214 of work piece 220 and form one of the facing ones of sides 124 of ridge 120. As shown at block 406, laser beam 218 is subsequently repositioned to completely machine groove 122 in surface 214 of work piece 220 and form another one of the facing ones of sides 124 of ridge 120. As shown at block 408, laser beam 218 is moved across surface 214. As shown at block 410, riblet 116 is machined in surface 214 by removing material from surface 214 by laser beam 218.

Referring to FIG. 13, and with reference to FIGS. 8 and 11, one example of method 500 is disclosed. Method 500 is one example implementation of the disclosed method for preparing fluid flow surface 106 utilizing system 200. Modifications, additions, or omissions may be made to method 500 without departing from the scope of the present disclosure. Method 500 may include more, fewer, or other steps. Additionally, steps may be performed in any suitable order.

As shown at block 502, method 500 may include the step of producing two laser beams 218. As shown at block 504, laser beams 218 are positioned to completely machine groove 122 in surface 214 of work piece 220 and form both of the facing ones of sides 124 of ridges 120. As shown at block 506, laser beams 218 are moved across surface 214. As shown at block 508, riblet 116 is machined in surface 214 by removing material from surface 214 by laser beams 218.

Figure 14:
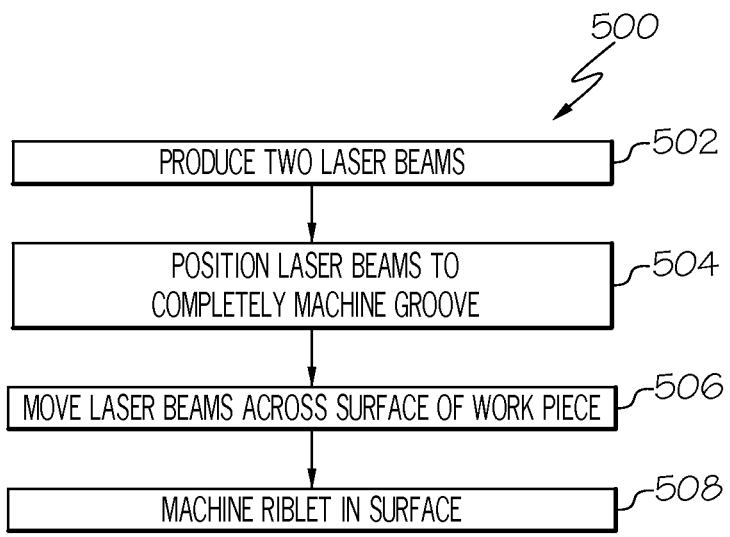
FIG. 14 is a flow diagram of one example of the disclosed method for preparing the fluid flow surface.
Figure 15:
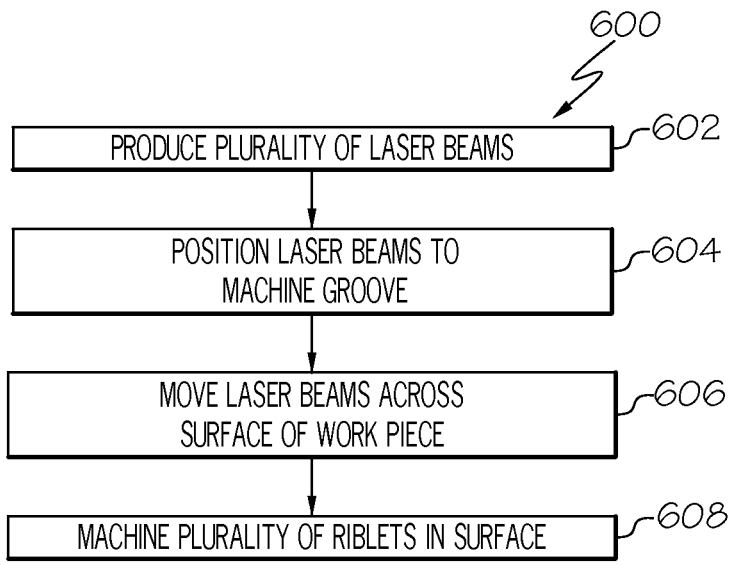
FIG. 15 is a flow diagram of one example of the disclosed method for preparing the fluid flow surface.

Referring to FIG. 14, and with reference to FIGS. 8-11, one example of method 600 is disclosed. Method 600 is one example implementation of the disclosed method for preparing fluid flow surface 106 utilizing system 200. Modifications, additions, or omissions may be made to method 600 without departing from the scope of the present disclosure. Method 600 may include more, fewer, or other steps. Additionally, steps may be performed in any suitable order.

As shown at block 602, method 600 may include the step of producing a plurality of laser beams 218, for example, by array of lasers 216 or by splitting one laser beam into a plurality of sub-beams. As shown at block 504, laser beams 218 are positioned to machine grooves 122 in surface 214 of work piece 220 and form both of the facing ones of sides 124 of ridges 120. As one example, each one of the plurality of laser beams 218 may completely machine grooves 122, for example, as described in method 300 and with reference to FIG. 12. As one example, each one of the plurality of laser beams 218 may partially machine grooves 122 and then subsequently completely machine grooves 122, for example, as described in method 400 and with reference to FIG. 13. As one example, pairs of the plurality of laser beams 218 may completely machine grooves 122, for example, as described in method 500 and with reference to FIG. 13. As shown at block 606, laser beams 218 are moved across surface 214. As shown at block 608, a plurality of riblets 116 is machined in surface 214 by removing material from surface 214 by laser beams 218.

In one example implementation of the disclosed methods, during preparation of fluid flow surface 106 and formation of riblets 116, as laser 202 (or array of lasers 216) is moved across surface 214 of work piece 220, a distance between laser 202 (e.g., a head of laser 202) and surface 214 (not explicitly illustrated) is maintained at a constant distance to ensure that the focus of laser beam 218 on surface 214 remains consistent. Ensuring a consistent and constant spot 212 of laser beam 218 may be required for processing a curved profile surface of riblet 116.

In one example implementation of the disclosed methods, the method may also include the step of post-processing fluid flow surface 106 following formation of riblets 116. As examples, the post-processing step may include one or more of polishing, vacuuming, cleaning, or otherwise removing debris from fluid flow surface 106.

Figure 16:
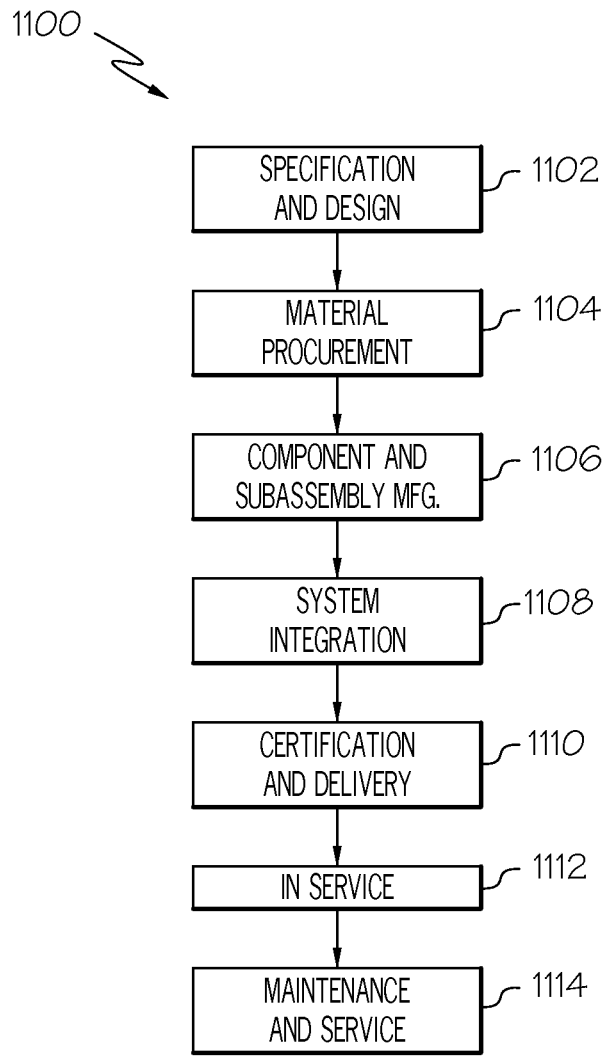
FIG. 16 is a block diagram of aircraft production and service methodology.

Examples of riblets 116 formed on fluid flow surface 106, system 200 for preparing fluid flow surface 106 with riblets 116, and method 300 for preparing fluid flow surface 106 with riblets 116 disclosed herein may be described in the context of aircraft manufacturing and service method 1100 as shown in FIG. 16 and aircraft 1200 as shown in FIG. 17. Aircraft 1200 may be one example of vehicle 100 (e.g., aircraft 102) illustrated in FIG. 1.

During pre-production, the illustrative method 1100 may include specification and design, as shown at block 1102, of aircraft 1200, which may include design (e.g., optimization of the geometry and/or placement) of riblets 116, and material procurement, as shown at block 1104. During production, component and subassembly manufacturing, as shown at block 1106, and system integration, as shown at block 1108, of aircraft 1200 may take place. Riblets 116 and the formation process on riblets 116 on fluid flow surface 106 as described herein may be accomplished as a portion of the production, component and subassembly manufacturing step (block 1106) and/or as a portion of the system integration (block 1108). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200. Riblets 116 may also be formed as a portion of routine maintenance and service (block 1114).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, aircraft 1200 produced by illustrative method 1100 may include airframe 1202 having fluid flow surface 106, as described with respect to FIGS. 1 and 2, and a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the systems, apparatus, and methods, or combination thereof may be utilized during production stages (blocks 1108 and 1110), for example, by substantially expediting assembly of or reducing the cost of aircraft 1200 by forming riblets 116 on fluid flow surface 106 to reduce drag. Similarly, one or more examples of the systems, apparatus, and methods, or a combination thereof, may be utilized, for example and without limitation, while aircraft 1200 is in service (block 1112) and during maintenance and service stage (block 1114).

Although various examples of embodiments and implementations of the disclosed system, apparatus, and method have been shown and described, modifications may occur to those skilled in the art upon reading the specification. The present application includes such modifications and is limited only by the scope of the claims.

What is claimed is:

1. A method for micromachining a fluid flow surface comprising a riblet microstructure in a surface coating coupled to a surface of a structure, said fluid flow surface configured to reduce drag from a fluid flowing over said fluid flow surface, said method comprising steps of:
   directing at least one ultraviolet laser beam at said surface coating, said ultraviolet laser beam having a plurality of operating parameters, including a pulse rate of between 1 femtosecond and 999 femtoseconds and a peak power of between 1 gigawatt and 10 gigawatts;
   moving said ultraviolet laser beam across said surface coating while depositing between 1 nanojoule and 1 megajoule of energy to a portion of said surface coating for between 1 femtosecond and 999 femtoseconds;
   removing said portion of said surface coating to form to form a length of said riblet microstructure having a cross-sectional shape by transforming said portion of said surface coating directly from a solid to a gas thereby limiting thermal damage to said structure and said surface coating; and wherein:
   said riblet microstructure comprises a plurality of grooves formed in said surface coating and a plurality of ridges formed by said surface coating, each one of said grooves is formed between an adjacent pair of said ridges;
   a ratio between a height of said ridges and a center-to-center distance between said adjacent pair of said ridges is between 0.2 and 1;
   said ridges and said grooves run parallel to each other and extend in a direction that is parallel to a direction of fluid flow;
   a depth of each one of said grooves is less than a thickness of said surface coating so that said surface of said structure remains covered with said surface coating; and
   said operating parameters of said laser beam are selected based on said cross-sectional shape of said riblet microstructure and a material composition of said surface coating.

2. The method of claim 1 wherein said step of removing said portion of said surface coating to form said length of said riblet microstructure having said cross-sectional shape further comprises:
   orienting said ultraviolet laser beam at a first incidence angle;
   removing a first portion of said surface coating with said ultraviolet laser beam to form a side of a first one of said adjacent pair of said ridges and a first portion of one of said grooves;
   reorienting said ultraviolet laser beam at a second incidence angle; and
   subsequently removing a second portion of said surface coating with said ultraviolet laser beam to form a side of a second one said adjacent pair of said ridges and a second portion of said one of said grooves.

3. The method of claim 1 wherein said step of removing said portion of said surface coating to form said length of said riblet microstructure having said cross-sectional shape further comprises:
   orienting said ultraviolet laser beam at a first incidence angle; and
   removing a portion of said surface coating with said laser beam to simultaneously form a side of a first one of said adjacent pair of said ridges, a side of a second one of said adjacent pair of said ridges, and all of one of said grooves.

4. The method of claim 1 wherein said step of removing said portion of said surface coating to form said length of said riblet microstructure having said cross-sectional shape further comprises forming at least one of said grooves having an inverted trapezoidal cross-sectional shape and forming at least one of said adjacent pair of said ridges having a triangular cross-sectional shape.

5. The method of claim 1 wherein said step of removing said portion of said surface coating to form said length of said riblet microstructure having said cross-sectional shape further comprises forming at least one of said grooves having an inverted triangular cross-sectional shape and forming at least one of said adjacent pair of said ridges having a triangular cross-sectional shape.

6. The method of claim 1 wherein said step of removing said portion of said surface coating to form said length of said riblet microstructure having said cross-sectional shape further comprises forming at least one of said grooves having an U-shaped cross-sectional shape and forming at least one of said adjacent pair of said ridges having a triangular cross-sectional shape with sides having a curved shape.

7. The method of claim 1 wherein said step of removing said portion of said surface coating to form said length of said riblet microstructure having said cross-sectional shape further comprises forming at least one of said grooves having a rectangular cross-sectional shape and forming at least one of said adjacent pair of said ridges having an approximately rectangular cross-sectional shape.

8. The method of claim 1 wherein:
   said structure is a portion of a vehicle, said vehicle being one of an air vehicle, a land vehicle, and a marine vehicle; and
   said fluid flow surface, comprising said riblet microstructure, is an exterior surface of said vehicle over which said fluid flows.

9. The method of claim 1 wherein said step of removing said portion of said surface coating to form said length of said riblet microstructure having said cross-sectional shape further comprises forming at least one of said grooves having said depth between 0.0015 inch and 0.0023 inch.

10. The method of claim 1 wherein said step of removing said portion of said surface coating to form said length of said riblet microstructure having said cross-sectional shape further comprises forming at least one of said ridges having a maximum width of between 0.0008 inch and 0.0023 inch.

11. The method of claim 1 wherein said step of removing said portion of said surface coating to form said length of said riblet microstructure having said cross-sectional shape further comprises forming at least one of said adjacent pair of said ridges having said center-to-center distance between 0.0024 inch and 0.003 inch.

12. The method of claim 1 wherein a ratio between a maximum width of at least one of said ridges and said center-to-center distance between at least one of said adjacent pair of said ridges is between 0.02 and 0.04.

13. The method of claim 1 wherein:
   said step of directing at least one ultraviolet laser beam at said surface coat comprises directing a first ultraviolet laser beam and a second ultraviolet laser beam, each of said first ultraviolet laser beam and said second ultraviolet laser beam having said pulse rate of between 1 femtosecond and 999 femtoseconds and said peak power of between 1 gigawatt and 10 gigawatts; and
   said step of removing said portion of said surface coating to form said length of said riblet microstructure having said cross-sectional shape further comprises:

orientating said first ultraviolet laser beam at a first incidence angle;

orienting said second ultraviolet laser beam at a second incidence angle; and simultaneously removing a first portion of said surface coating with said first ultraviolet laser beam and a second portion of said surface coating with said second ultraviolet laser beam to simultaneously form a side of a first one of said adjacent pair of said ridges, a side of a second one of said adjacent pair of said ridges, and all of one of said grooves.

14. The method of claim 1 further comprising directing at least one additional ultraviolet laser beam at said surface coat, said additional ultraviolet laser beam having said pulse rate of between 1 femtosecond and 999 femtoseconds and said peak power of between 1 gigawatt and 10 gigawatts; and wherein said step of removing said portion of said surface coating to form said length of said riblet microstructure having said cross-sectional shape further comprises:

removing a first portion of said surface coating with said ultraviolet laser beam to form a side of a first one of said ridges, a side of a second one of said ridges, adjacent to said first one of said ridges, and one of said grooves; and simultaneously removing a second portion of said surface coating with said additional ultraviolet laser beam to form another side of said second one of said ridges, a side of a third one of said ridges, adjacent to said second one of said ridges, and another one of said grooves.

15. A method for micromachining a fluid flow surface comprising a riblet microstructure in a surface coating coupled to a surface of a structure, said fluid flow surface configured to reduce drag from a fluid flowing over said fluid flow surface, said method comprising steps of:

directing a first ultraviolet laser beam at said surface coating, said first ultraviolet laser beam having a first pulse rate of between 1 femtosecond and 999 femtoseconds and a first peak power of between 1 gigawatt and 10 gigawatts;

directing a second ultraviolet laser beam at said surface coating, said second ultraviolet laser beam having a second pulse rate of between 1 femtosecond and 999 femtoseconds and a second peak power of between 1 gigawatt and 10 gigawatts;

orienting a first centerline of said first ultraviolet laser beam at a first incidence angle;

orienting a second centerline of said second ultraviolet laser beam at a second incidence angle;

depositing between 1 nanojoule and 1 megajoule of energy to a portion of said surface coating for between 1 femtosecond and 999 femtoseconds;

limiting thermal damage to said structure and said surface coating, surrounding focal points of said first ultraviolet laser beam and said second ultraviolet laser beam;

moving said first ultraviolet laser beam and said second ultraviolet laser beam across said surface coating in a direction that is parallel to a direction of fluid flow; and simultaneously removing a first portion of said surface coating with said first ultraviolet laser beam and a second portion of said surface coating with said second ultraviolet laser beam to simultaneously form a length of said riblet microstructure having a cross-sectional shape at least partially formed by a side of a first one of a plurality of ridges, a side of a second one of said plurality of ridges, and one of a plurality of grooves formed between said first one of said plurality of ridges and said second one of said plurality of ridges; and wherein:

said riblet microstructure comprises said plurality of grooves formed in said surface coating and said plurality of ridges formed by said surface coating, each one of said plurality of grooves is formed between an adjacent pair of said plurality of ridges;

a ratio between a height of said plurality of ridges and a center-to-center distance between said adjacent pair of said plurality of ridges is between 0.2 and 1;

said plurality of ridges and said plurality of grooves run parallel to each other and extend in a direction that is parallel to a direction of fluid flow; and each one of said plurality of grooves has a depth that is less than a thickness of said surface coating so that said surface of said structure remains covered with said surface coating.

16. The method of claim 15 wherein said steps of directing said first ultraviolet laser beam and directing said second ultraviolet laser beam comprise at least partially overlapping a first spot of said first ultraviolet laser beam and a second spot of said second ultraviolet laser beam on said surface coating.

17. The method of claim 15 wherein:

at least one of said first incidence angle of said first centerline of said first ultraviolet laser beam and said second incidence angle of said second center line of said second ultraviolet laser beam is between 15 degrees and 26.5 degrees; and said steps of orienting said first centerline of said first ultraviolet laser beam and orienting said second centerline of said second ultraviolet laser beam comprise orienting said first centerline of said first ultraviolet laser beam and said second centerline of said second ultraviolet laser beam relative to each other so that said first centerline and said second centerline intersect each other.

18. The method of claim 15 wherein:

said structure is a portion of a vehicle, said vehicle being one of an air vehicle, a land vehicle, and a marine vehicle; and said fluid flow surface, comprising said riblet microstructure, is an exterior surface of said vehicle over which said fluid flows.

19. The method of claim 15 wherein said step of simultaneously removing said first portion of said surface coating with said first ultraviolet laser beam and said second portion of said surface coating with said second ultraviolet laser beam to simultaneously form said length of said riblet microstructure having said cross-sectional shape further comprises:

forming at least one of said plurality of grooves having said depth between 0.0015 inch and 0.0023 inch;

forming at least one of said plurality of ridges having a maximum width of between 0.0008 inch and 0.0023 inch; and forming at least one of said adjacent pair of said ridges having said center-to-center distance between 0.0024 inch and 0.003 inch.

20. The method of claim 15 wherein a ratio between a maximum width of at least one of said ridges and said center-to-center distance between at least one of said adjacent pair of said ridges is between 0.02 and 0.04.

* * * * *